US006128375A

United States Patent [19]
Punzalan et al.

[11] Patent Number: 6,128,375
[45] Date of Patent: Oct. 3, 2000

[54] INTELLIGENT MULTIFUNCTION DEVICE FOR ANALOG TELEPHONE SUBSCRIBER LOOP INTERFACES

[76] Inventors: Edilberto Abad Punzalan, 13630 Skyline Blvd., Woodside, Calif. 94062; Alejandro Bonifacio Soria, Jr., 804 Domingo Santiago St., Sampaloc Manila 1008, Philippines

[21] Appl. No.: 08/968,343

[22] Filed: Nov. 12, 1997

[51] Int. Cl.[7] .................................................. H04M 1/66
[52] U.S. Cl. ......................... 379/199; 379/204; 379/210; 379/211
[58] Field of Search .................................. 379/199, 88.16, 379/283, 350, 356, 373, 441, 201, 204, 210, 211

[56] References Cited

U.S. PATENT DOCUMENTS 5,673,299  9/1997  Fuller et al. .............................. 379/201

*Primary Examiner*—Fan Tsang
*Assistant Examiner*—Bing Bui

[57] ABSTRACT

A single and versatile standalone apparatus that provides for remote control of several custom calling services such as call forward, call bridge, call transfer, conference call and call back. The apparatus is flexible enough to be further used as a remote store and forward dialer for various other services. The device is controlled by a microcontroller and has non-volatile memory to facilitate storage of configuration options. It can be connected directly to the analog public switched telephone network (PSTN) or to private branch exchanges (PBXs) supporting analog loop signaling. The device also has means to transmit and receive tone dialing and hook signals. Furthermore, the device supports both remote usage and reconfiguration. What this invention embodies is a single apparatus that is capable of handling several functions previously only available via several separate devices. The device is designed as a standalone home appliance that can be easily installed by the end-user and which requires little or no maintenance.

4 Claims, 6 Drawing Sheets

INTELLIGENT MULTIFUNCTION DEVICE FOR ANALOG TELEPHONE SUBSCRIBER LOOP INTERFACES

FIELD OF THE INVENTION

The present invention relates to the field of electronics in general and telecommunications switching and signaling in particular. The present invention also utilizes integrated circuit technology and uses microcontrollers, solid-state memory devices as well as digital and analog components. Thus it is also related to the field of programmable logic control and data processing.

BACKGROUND OF THE INVENTION

With the advent of digital central office exchanges and digital private branch exchanges (PBXs), there has been an increase in the number of services available to telephone subscribers. These services include call forwarding, call transfer, three way calling or mini-conferencing, direct distance dialing, toll-free numbers and many others. The availability of these services has led to the development of applications and commercial activity specifically tailored to exploit these new features and functions. However due to differences in telephone company policies from different localities, the implementation of these new services has not been uniformly distributed. This in turn has also led to the desirability of gaining the capability of using a specific locality's telephone services from within another locality. Almost all solutions seen thus far has been geared towards a system integration model suited for small to medium sized entities or, if not, towards specialized, single use devices with limited functionality. Until now.

The present invention, in one embodiment, answers these needs by offering a single device designed for individual use and installation. It embodies a means of utilizing the services of the telephone company in one locality in a manner which can be remotely initiated and controlled by a user in another locality. Almost all of the services provided by the telephone company in the invention's locality is thus accessible and can be utilized by a remote user. Furthermore, because of the diversity of the services being offered by the different telephone companies, the present invention has been designed to be flexible enough to perform several functions and can be adapted to function in as many localities as possible.

SUMMARY OF THE INVENTION

Generally speaking the present invention provides a single standalone and intelligent telecommunications device capable of implementing several call switching functions in a user initiated but independently controlled manner. The present invention is connected to the analog two wire subscriber loop interface from the local telephone carrier. Using standard subscriber line signaling and standard DTMF tone signaling, the present invention provides the capability for remote dial, call back, call forward, call transfer call bridge and other custom calling services provided by a telephone carrier under the control of a preprogrammed microcontroller.

DETAILED DESCRIPTION OF THE PREFERRED EMBODIMENTS

Figure 1:
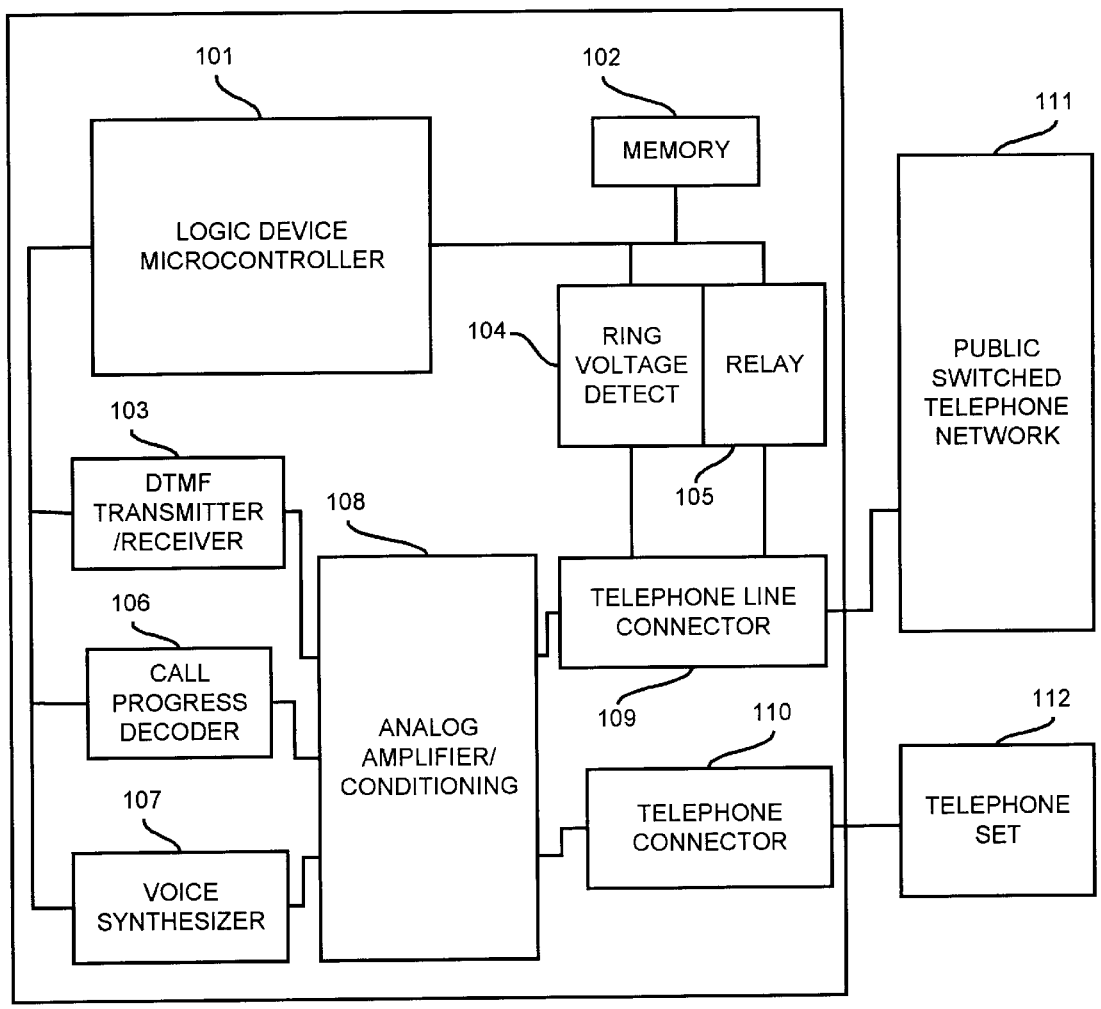
FIG. 1 is a block diagram of the device in relation to how it is situated with respect to the Public Switched Telephone network and to a telephone set. It shows the connections between the various components of the apparatus.
Figure 5:
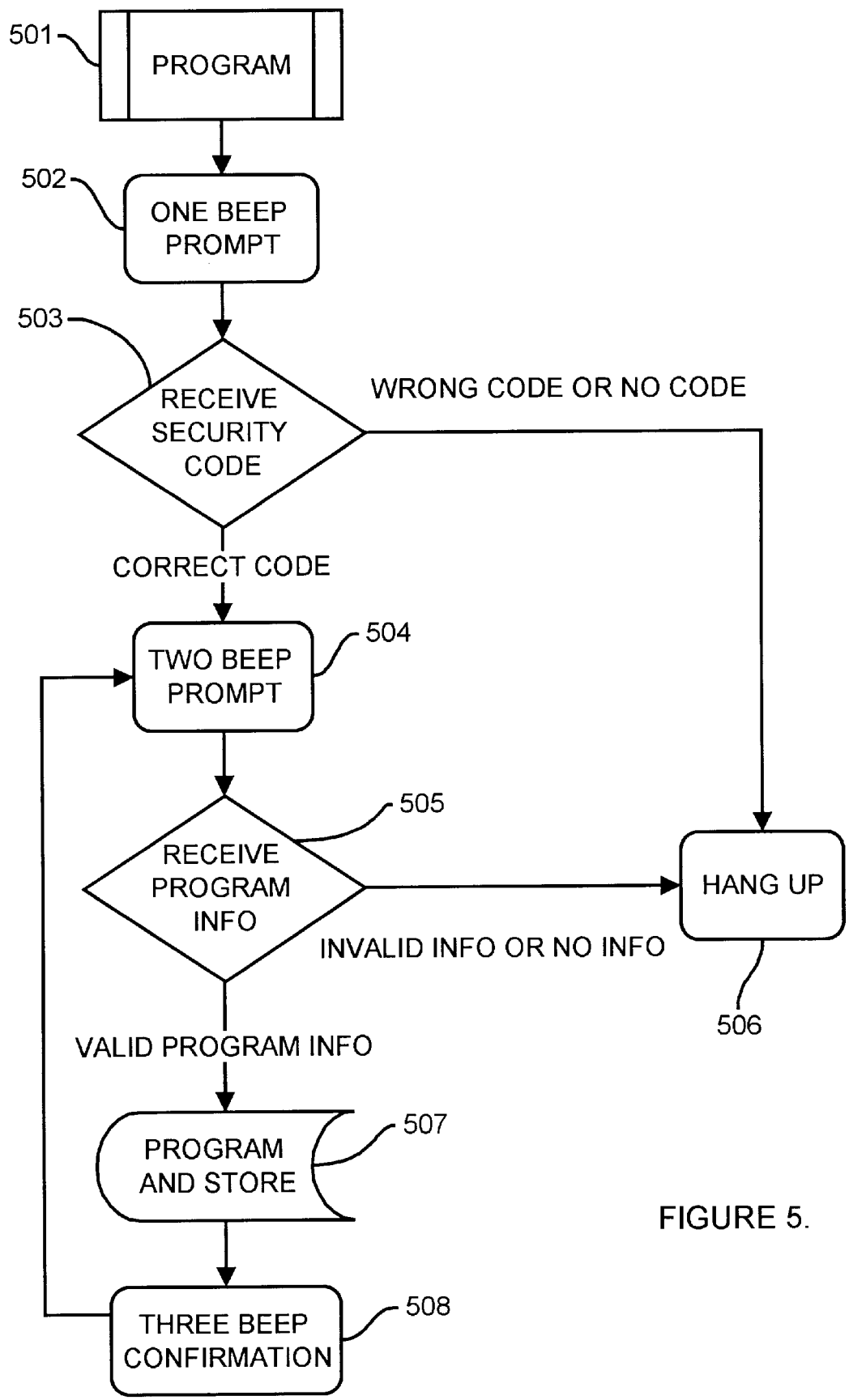
FIG. 5 details the flow of logic for implementing the PROGRAM function.

In particular, referring to FIG. 1, the device is composed of a telephone line connector (109) for interfacing with the analog telephone network (111), amplifier circuits (108) for conditioning signals emanating and being sent to the telephone line connector, a telephone set connector (110) and a programmable logic unit (a microcontroller) (101) which directly controls several peripheral components. These components are a non-volatile digital memory device (102) for storing configuration parameters and user programmed telephone numbers, a DTMF transmitter and receiver (103) for DTMF signaling, a relay (105) for pulse signaling, a call progress decoder (106) for tracking the status of a call, a ring detector (104) and a voice synthesizer (107) for record and playback of a user voice message. From FIG. 5, the user programs a sequence of numbers into the memory of the present invention (505) as well as a four digit password key (503) and an optional voice recording. The programming is done either via a telephone set (112) connected to the telephone port on the present invention or by making a call to the present invention from a remote location. The numeric sequence can then be used as either a call back number, a call forward number, as a command string into a home controller or for unattended dialing. From FIG. 5, the user has several other programmable options available in order to accomplish call transfer, call bridging, remote programming and timed call termination. These functions are implemented in such a way that they are accessible to a user who is not necessarily in the immediate vicinity of the present invention.

Figure 2:
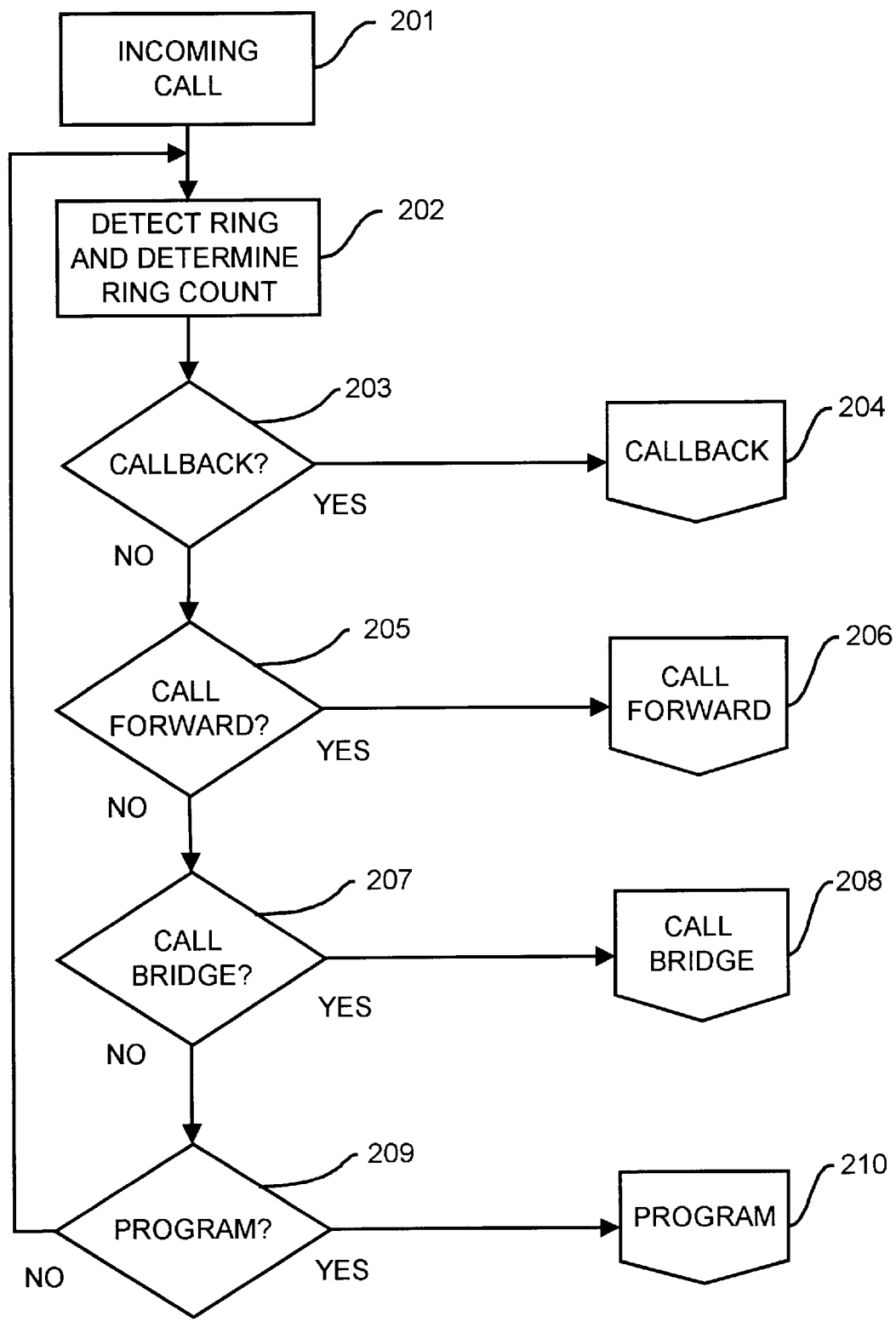
FIG. 2 is the top level diagram of one embodiment of the present invention.
Figure 3:
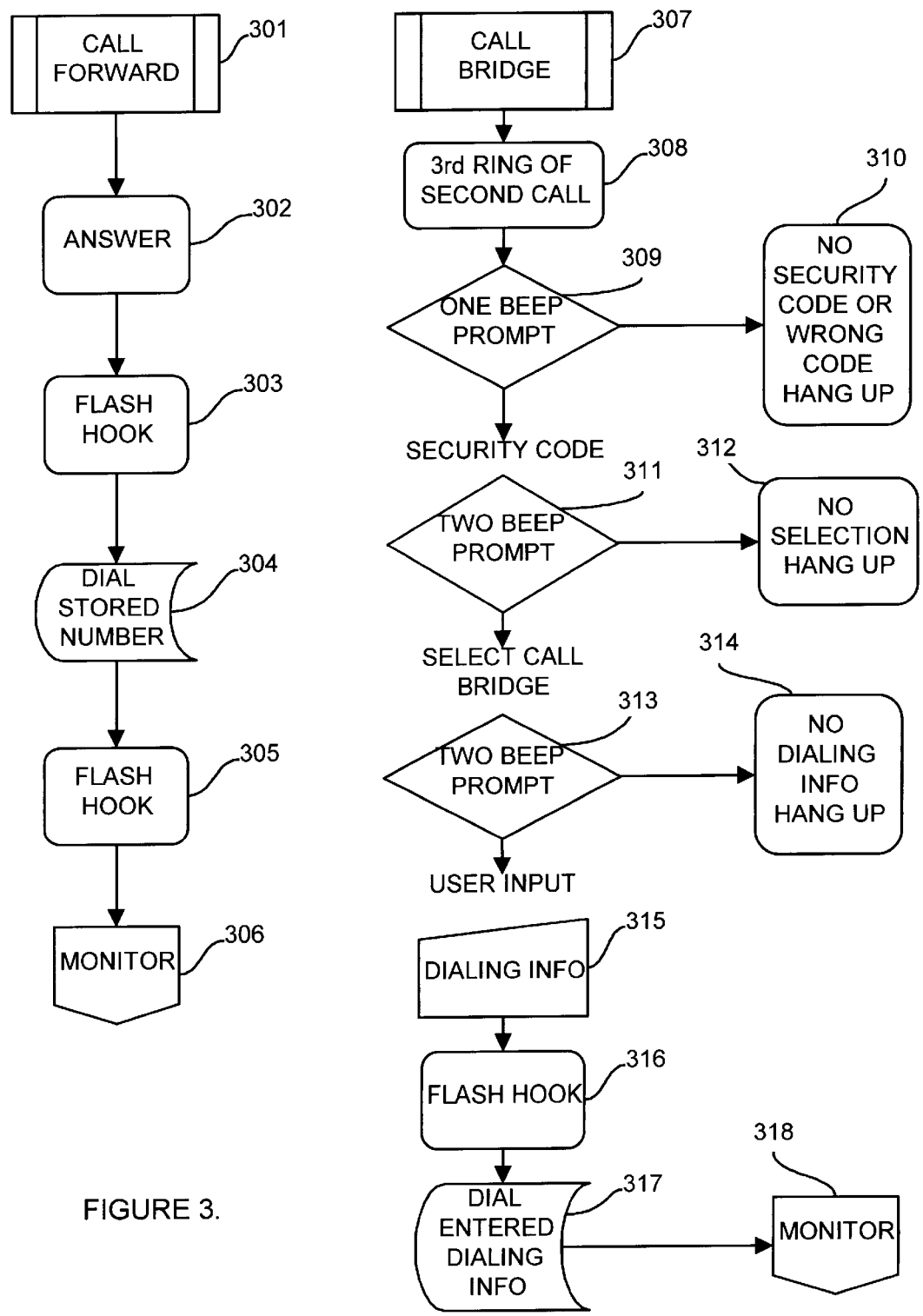
FIG. 3 details the flow of logic for implementing the CALL FORWARD and CALL BRIDGE functions.
Figure 4:
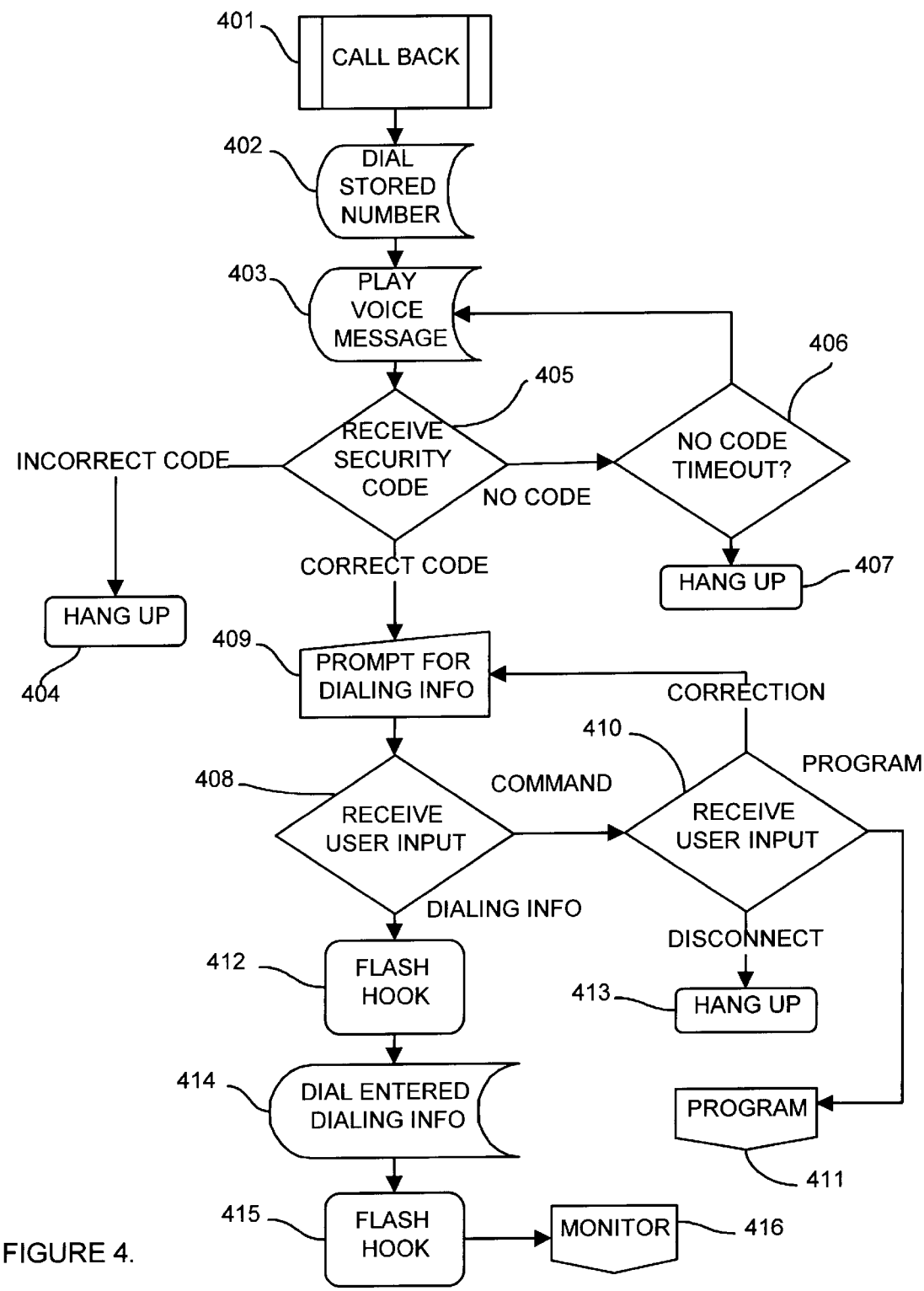
FIG. 4 details the flow of logic for implementing the CALL BACK function.

In one embodiment of the present invention, the device is connected to a phone line with three-way or mini-conferencing capabilities (FIG. 2). It will count the number of rings of an incoming call, and if it is one or two, and only one or two, it will call back the preprogrammed call back number (402). The user will then answer, hear the recorded message (403), if any, and enter the security code (405). The present invention will respond with two beeps (408), prompting the user to begin dialing the number to be called. The user must dial the number as if they are calling from the location of the present invention (409), including any PBX outside line access (9, * for pause, and then number), carrier access (e.g., 10333, 10222, etc.), area code (1-XXX), or outbound international call (011, for the USA). The present invention will assume that dialing is finished after 3½ seconds from the last digit entered and will perform a flashhook (412), putting the user on hold, and dial the number that was entered by the user (414). Should the user make a mistake during dialing and 3½ seconds has not elapsed (first flashhook has not occurred), the user can signal the present invention to ignore the previously entered numeric data and restart with another two-beep prompt (410), allowing the user to redial the correct number. After the present invention has dialed the number, it will wait for the first ring back, busy signal, or a pre-determined time before doing another flashhook and dialing the PBX code (if any) to connect the two parties. If the called party is busy or there is no answer or the user wishes to make another call, the user can signal the present invention to get another two-beep prompt to redial the number or call another number.

Figure 6:
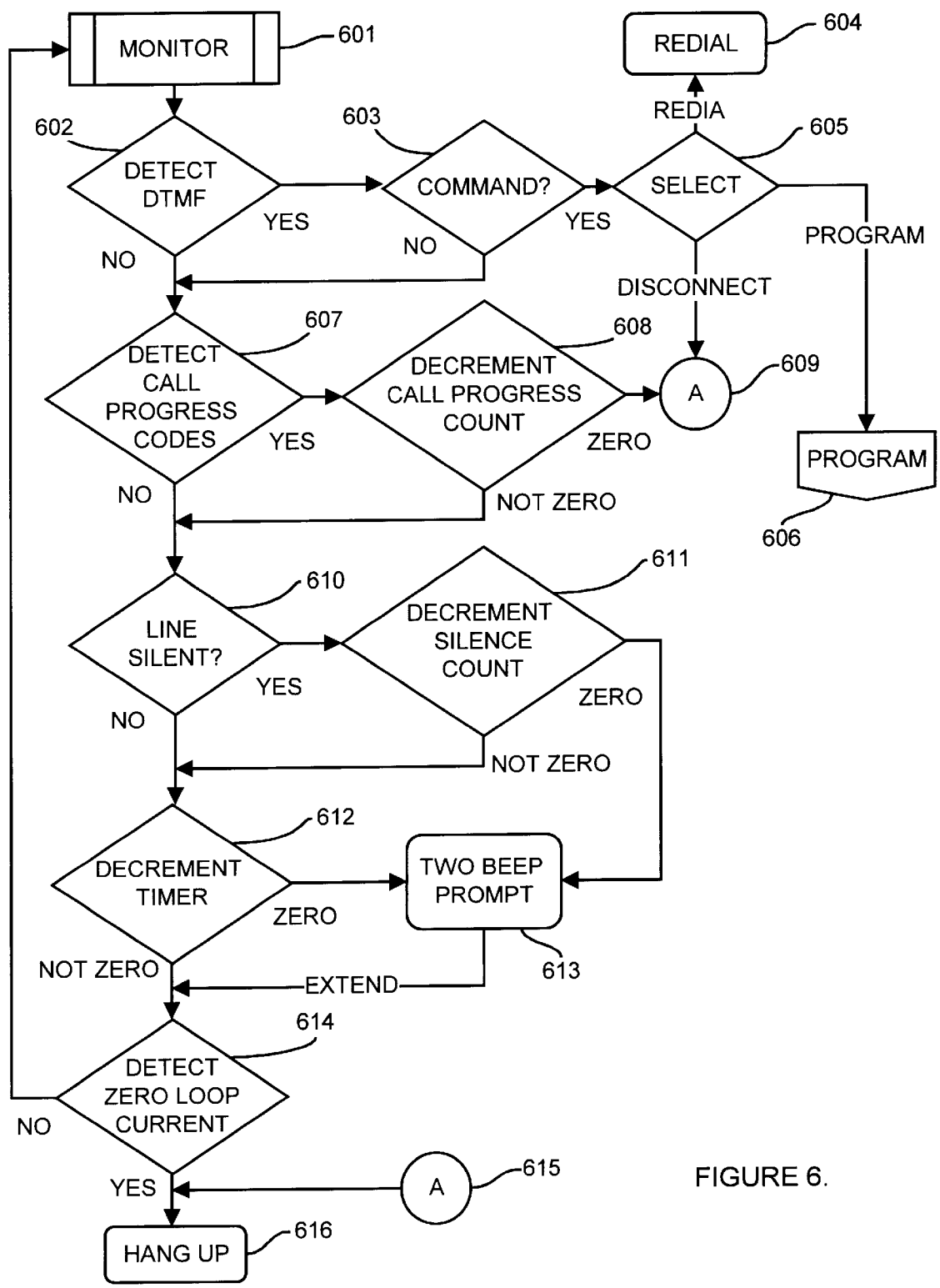
FIG. 6 details the flow of logic for implementing the MONITOR function.

Referring now to FIG. 6. The present invention times the conversation in accordance with the preprogrammed call length timer (612). When the preprogrammed time is reached, the present invention gives two beeps (613), warning the user to dial any digit to extend the call by another period equal to the preprogrammed time or else the present invention will disconnect within ten seconds. The present invention also monitors the activity of the call. It can detect busy signal (607), ring back (607), conversation (610), both parties hanging up (614), and no activity or silence of over two minutes (610), all of which will cause it to disconnect at some pre-determined time. When the call is finished and the user wants to terminate, the user signals the present invention (603) to disconnect before hanging up (605). Otherwise, it will take time before the present invention can detect the end of the call. This is also true when the called line is busy or there is no answer.

In another embodiment, the present invention will count the number of rings of the incoming call and automatically answer (302) at the preprogrammed number of rings when the call forward function is enabled (301). The present invention will perform an initial flashhook (303), putting the caller on hold, dial the preprogrammed call forward number (304), do another flashhook (305), and connect the call to the user.

In yet another embodiment, the user can call the present invention from anywhere, wait for three rings (202), and immediately hang up. After five seconds (but not more than two minutes), the user can call the present invention again. On the third ring of the second call, it will answer automatically (308) and give a one-beep prompt (309). The user must enter the security code or else the present invention will disconnect in about five seconds (310). It will disconnect immediately if the wrong code is entered. Upon entering the right code, the present invention will give a two-beep prompt (311) after which the user can signal the present invention to go into call bridge mode. The present invention will give another two beeps (313), prompting the user to begin dialing the number to be called (315).

The preceding has explained in detail some of the possible embodiments of the present invention. Due to the flexibility of the device, these does not constitute the totality of all the possible embodiments and applications of the present invention that any person skilled in the art can envision. The scope of the present invention should thus be defined only by the following claims.

We claim:

1. A compact, low-cost and easy to use apparatus for connection to a switched telephone network via a single analog, standard tip-ring, two-wire subscriber line; said analog telephone network not being limited to the Public Switched Telephone Network (PSTN) but also including analog Private Automatic Branch Exchanges (PABXs); and said apparatus being capable of accessing custom calling services provided by the said telephone network as well as possessing reception means, storage means and retrieval control of dialing and number information for subsequent unattended remote dial, said apparatus comprising of:

a single pre-programmed low-cost 8-bit microcontroller with integral read-only memory (ROM) containing the program and with internal random-access memory (RAM) for temporary storage for control and scheduling and for processing of call information;

a low-cost, non-volatile, serial digital memory means connected to the said pre-programmed microcontroller for use as storage for configuration and dialing information;

a simple, low-cost, analog and passive telephone line connector circuit for interfacing to a single analog, standard tip-ring, two wire telephone subscriber line;

a ring voltage detection circuit connected to the said single telephone line connector and the said pre-programmed microcontroller for detecting ring voltage generated by the said switched telephone network on the said telephone subscriber line;

a relay connected to the said single telephone line connector controlled by the said pre-programmed microcontroller for control of the said telephone subscriber line via simulated hook flashing via opening and closing the contacts of the said relay;

a simple and low-cost analog conditioning circuit connected to the said single telephone line connector for filtering and amplification of analog signals from the said single telephone subscriber line;

a cost-effective single-chip digital voice synthesizer connected to the said analog conditioning circuit and controlled by the said pre-programmed microcontroller for record and playback of voice messages;

a simple activity detect circuit connected to the said conditioning circuit and controlled by the said pre-programmed microcontroller for detection of voice activity signals or silence on the said single telephone subscriber line;

a low-cost dual-tone multi-frequency (DTMF) generator and a low-cost DTMF receiver connected to the said conditioning circuit and controlled by the said pre-programmed microcontroller for sending touch-tone dialing and user prompts and for receiving DTMF, respectively, over the said single telephone subscriber line;

a low-cost single-chip call progress decoder connected to the said conditioning circuit and to the said pre-programmed microcontroller for the monitoring of the presence or absence of call progress signals on the said single telephone subscriber line; and a simple calling party control (CPC) detection circuit connected to the said single telephone subscriber line connector and to the said pre-programmed microcontroller for detecting end-of-call termination by the calling party.

2. The apparatus of claim 1 further comprising of a simple and cost-effective telephone port connected to the said pre-programmed microcontroller for connection of a standard analog touch-tone telephone set for local programming of the said preprogrammed microcontroller's operating parameters.

3. The telephone port of claim 2 comprising of a twelve-volt direct current supply source coupled to a resistor network for powering the said analog touch-tone telephone set.

4. A method of signaling the apparatus of claim 1 and selecting a specific desired function or response without actually completing a call, said method being comprised of:

placing a call to the said telephone line from a remote location and generating a specific ring count on the said telephone line by counting the number of ring back tones heard and then discontinuing (hanging up) the call after the desired number or ring back tones are heard, while making sure that the call is not completed by not waiting for the apparatus to answer the call;

establishing silent intervals of several seconds duration between generation of said specific ring counts on the said telephone line; and selecting a specific desired response/function by repeating the above procedure in a pre-determined order.

* * * * *